(12) United States Patent
Baek et al.

(10) Patent No.: US 7,588,310 B2
(45) Date of Patent: Sep. 15, 2009

(54) INKJET IMAGE FORMING SYSTEM AND METHOD OF INCREASING A PRINTING SPEED THEREOF

(75) Inventors: O-hyun Baek, Seoul (KR); Masahiko Habuka, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 501 days.

(21) Appl. No.: 11/427,966

(22) Filed: Jun. 30, 2006

(65) Prior Publication Data

US 2007/0070095 A1    Mar. 29, 2007

(30) Foreign Application Priority Data

Jun. 30, 2005 (KR) .................. 10-2005-0058605
Apr. 3, 2006 (KR) .................. 10-2006-0030151

(51) Int. Cl.
*B41J 2/165* (2006.01)
(52) U.S. Cl. .................. 347/23; 347/29; 347/30; 347/33
(58) Field of Classification Search .................. 347/14, 347/22–35
See application file for complete search history.

(56) References Cited

U.S. PATENT DOCUMENTS 5,850,237 A   12/1998   Slade 6,082,846 A   7/2000   Terasawa et al.

FOREIGN PATENT DOCUMENTS

| JP | 3-269551 | | 12/1991 |
|---|---|---|---|
| JP | 4-212880 | | 8/1992 |
| JP | 04-212880 | * | 8/1992 |
| JP | 5-50718 | | 3/1993 |
| JP | 05-050718 | * | 3/1993 |
| JP | 5-323708 | | 12/1993 |
| JP | 11-245393 | | 9/1999 |
| JP | 2001-239724 | | 9/2001 |

OTHER PUBLICATIONS

Korean Office Action dated Mar. 21, 2007 issued in KR 2006-30151.

* cited by examiner

*Primary Examiner*—Shih-Wen Hsieh
(74) *Attorney, Agent, or Firm*—Stanzione & Kim LLP

(57) ABSTRACT

An inkjet image forming system and method of increasing a printing speed thereof. According to the system and method, at least a portion of a first lead time of a first process that includes processing printing data in a host and transmitting the printing data to an inkjet image forming apparatus is overlapped with at least a portion of a second lead time of a second process that includes performing a maintenance operation on a printhead using a maintenance unit, thereby increasing the printing speed of the inkjet image forming system.

31 Claims, 4 Drawing Sheets

INKJET IMAGE FORMING SYSTEM AND METHOD OF INCREASING A PRINTING SPEED THEREOF

CROSS-REFERENCE TO RELATED APPLICATIONS

This application claims the benefit of Korean Patent Application No. 10-2005-0058605, filed on Jun. 30, 2005, and Korean Patent Application No. 10-2006-0030151, filed on Apr. 3, 2006, in the Korean Intellectual Property Office, the disclosures of which are incorporated herein in their entirety by reference.

BACKGROUND OF THE INVENTION

1. Field of the Invention

The present general inventive concept relates to an inkjet image forming system, and more particularly, to an inkjet image forming system and method of increasing a printing speed thereof by improving a maintenance method of a printhead.

2. Description of the Related Art

An inkjet image forming system includes a host device (hereinafter 'host') and an inkjet image forming apparatus. The host can be, for example, a personal computer, a digital camera, or a personal digital assistant (PDA). The inkjet image forming apparatus is an apparatus, such as an inkjet printer or an inkjet facsimile.

A printing speed of the inkjet image forming system is generally determined by a printing time of a printhead, paper feeding and discharging times, and a maintenance time. The maintenance time is used to prepare an inkjet nozzle for printing. For example, the maintenance time includes a wiping time and a spitting time.

A conventional method of printing with an inkjet printhead is described in U.S. Pat. No. 6,082,846. Here, the conventional printing method includes wiping a surface of the inkjet printhead, spitting ink from the printhead, and then performing normal printing without wiping the surface of the inkjet printhead after the spitting. The maintenance operations of wiping and spitting are performed after printing data has been processed by the host.

However, since the maintenance operations are performed after the printing data has been processed, the printing speed decreases.

SUMMARY OF THE INVENTION

The present general inventive concept provides an inkjet image forming system and method of increasing a printing speed thereof, in which a printing data processing time and a maintenance operation time are controlled to increase the printing speed.

Additional aspects of the present general inventive concept will be set forth in part in the description which follows and, in part, will be obvious from the description, or may be learned by practice of the general inventive concept.

The foregoing and/or other aspects of the present general inventive concept are achieved by providing a method of increasing the printing speed of an inkjet image forming system having an inkjet image forming apparatus with a printhead and a maintenance unit, and a host in communication with the inkjet image forming apparatus, the method including overlapping at least a portion of a first lead time of a first process that includes processing a printing data in the host and transmitting the printing data to the inkjet image forming apparatus with at least a portion of a second lead time of a second process that includes performing a maintenance operation on the printhead using the maintenance unit.

A start point and an end point of the first process may be synchronized with a start point and an end point of the second process, respectively, to maximize the overlap between the first lead time of the first process and the second lead time of the second process.

If the first lead time of the first process is longer than the second lead time of the second process, the start point and the end point of the second process may occur within the first lead time of the first process. Further, the start point of the first process may be coincident with the start point of the second process, or the end point of the first process may be coincident with the end point of the second process.

If the second lead time of the second process is longer than the first lead time of the first process, the start point and the end point of the first process may occur within the second lead time of the second process. Further, the start point of the first process may be coincident with the start point of the second process or the end point of the first process may be coincident with the end point of the second process.

The first process may include generating printing data using an application program running in the host, converting the printing data into instructions that are interpretable by the inkjet image forming apparatus, and transmitting the instructions to the inkjet image forming apparatus.

The second process may include wiping the printhead to remove ink stuck to the printhead, and spitting a small amount of ink from the printhead. The second process may further include preheating the printhead according to printing circumstances.

The foregoing and/or other aspects of the present general inventive concept are also achieved by providing a method of forming an image in an image forming apparatus having a printhead, the method including performing one or more preparation operations on the printhead while print data is being processed in a host device in communication with the image forming apparatus.

The foregoing and/or other aspects of the present general inventive concept are also achieved by providing a method of forming an image, the method including generating print data, estimating a processing time to process the generated print data, and outputting the processing time to process the generated print data to an image forming apparatus such that the image forming apparatus performs any preparation operations on a printhead according to the output processing time.

The foregoing and/or other aspects of the present general inventive concept are also achieved by providing a method of forming an image in an image forming apparatus, the method including receiving a processing time to process print data from a host device, estimating a maintenance time to prepare the image forming apparatus for printing, and comparing the maintenance time with the processing time and beginning maintenance on the image forming apparatus before the processing time has expired.

The foregoing and/or other aspects of the present general inventive concept are also achieved by providing an inkjet image forming apparatus including a printhead to eject ink to print printing data and a maintenance unit to perform a maintenance operation on the printhead, a host in communication with the inkjet image forming apparatus, and a controller to generate a control signal to overlap at least a portion of a first process that includes processing printing data in the host and transmitting the printing data to the inkjet image forming apparatus with at least a portion of a second process that includes performing a maintenance operation on the printhead using the maintenance unit.

The controller may generate a control signal synchronizing a start point and an end point of the first process with a start point and an end point of the second process, respectively, to maximize an overlapping time between the first process and the second process.

If a first lead time of the first process is longer than a second lead time of the second process, the controller may generate a control signal to control the start point and the end point of the second process to occur within the first lead time of the first process. Further, the controller may generate a control signal that makes the start point of the first process coincident with the start point of the second process or the end point of the first process coincident with the end point of the second process.

If a second lead time of the second process is longer than a first lead time of the first process, the controller may generate a control signal making the start point and the end point of the first process occur within the second lead time of the second process. Further, the controller may generate a control signal that makes the start point of the first process coincident with the start point of the second process or the end point of the first process coincident with the end point of the second process.

The host may include a printing data generator to generate printing data using an application program running in the host, a printing data converter to convert the printing data into instructions that are interpretable by the inkjet image forming apparatus, and a printing data transmitter to transmit the instructions to the inkjet image forming apparatus.

The foregoing and/or other aspects of the present general inventive concept are also achieved by providing an image forming system, including an image forming apparatus having a printhead, a maintenance unit, and a controller to control the maintenance unit to perform one or more preparation operations on the printhead of the image forming apparatus while print data is being processed in a host device in communication with the image forming apparatus.

The foregoing and/or other aspects of the present general inventive concept are also achieved by providing an image forming system, including a host device having a printing data generator to generate print data, and a printing data calculator to estimate a processing time to process the generated print data and to output the processing time to process the generated print data to an image forming apparatus such that the image forming apparatus performs any preparation operations according to the output processing time.

The foregoing and/or other aspects of the present general inventive concept are also achieved by providing an image forming system, including an image forming apparatus having a maintenance unit, a maintenance calculator to estimate a maintenance time to prepare the image forming apparatus for printing, and a controller to receive a processing time to process print data from a host device, to compare the maintenance time with the processing time, and to control the maintenance unit to begin maintenance on the image forming apparatus before the processing time has expired.

The foregoing and/or other aspects of the present general inventive concept are also achieved by providing a computer readable medium containing executable code to control an image forming apparatus having a maintenance unit, the medium including a first executable code to estimate a maintenance time to prepare the image forming apparatus for printing, and a second executable code to receive a processing time to process print data from a host device, to compare the maintenance time with the processing time, and to control the maintenance unit to begin maintenance on the image forming apparatus before the processing time has expired.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
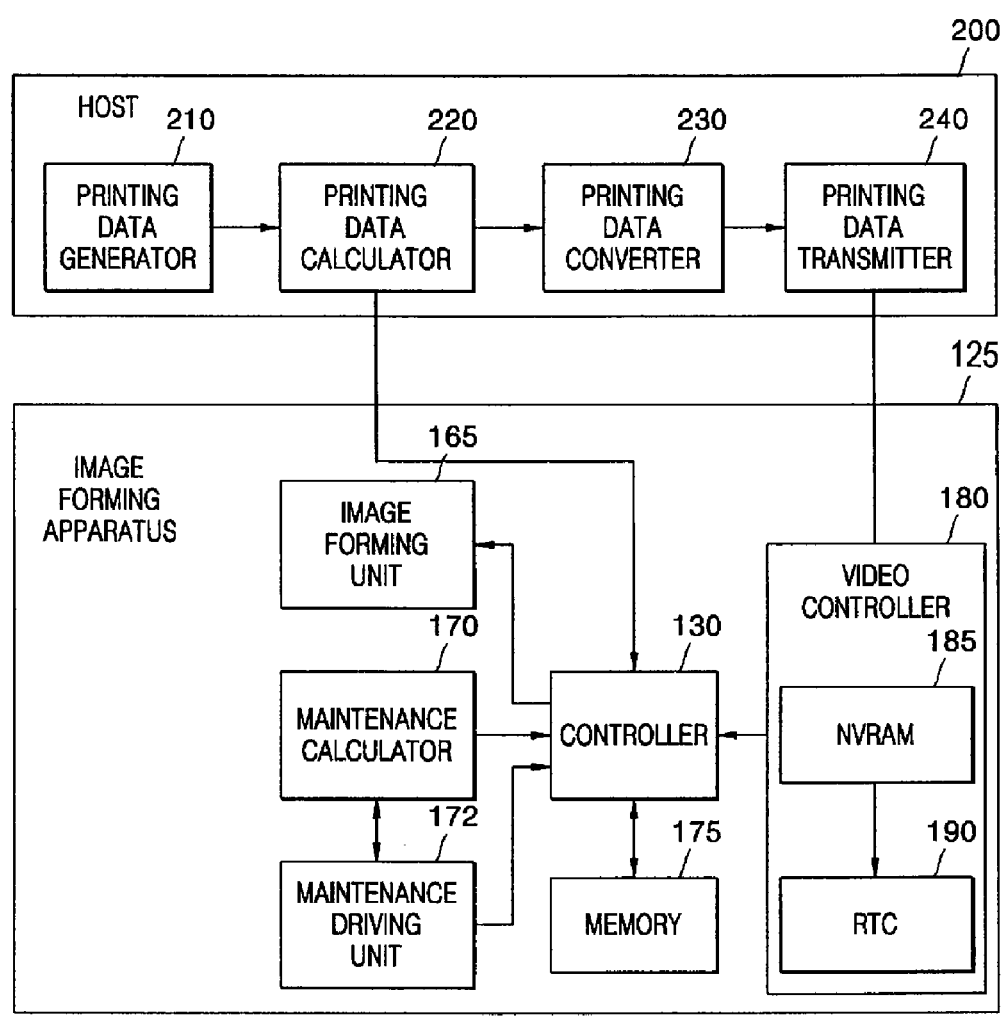
FIG. 1 is a block diagram illustrating an inkjet image forming system according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
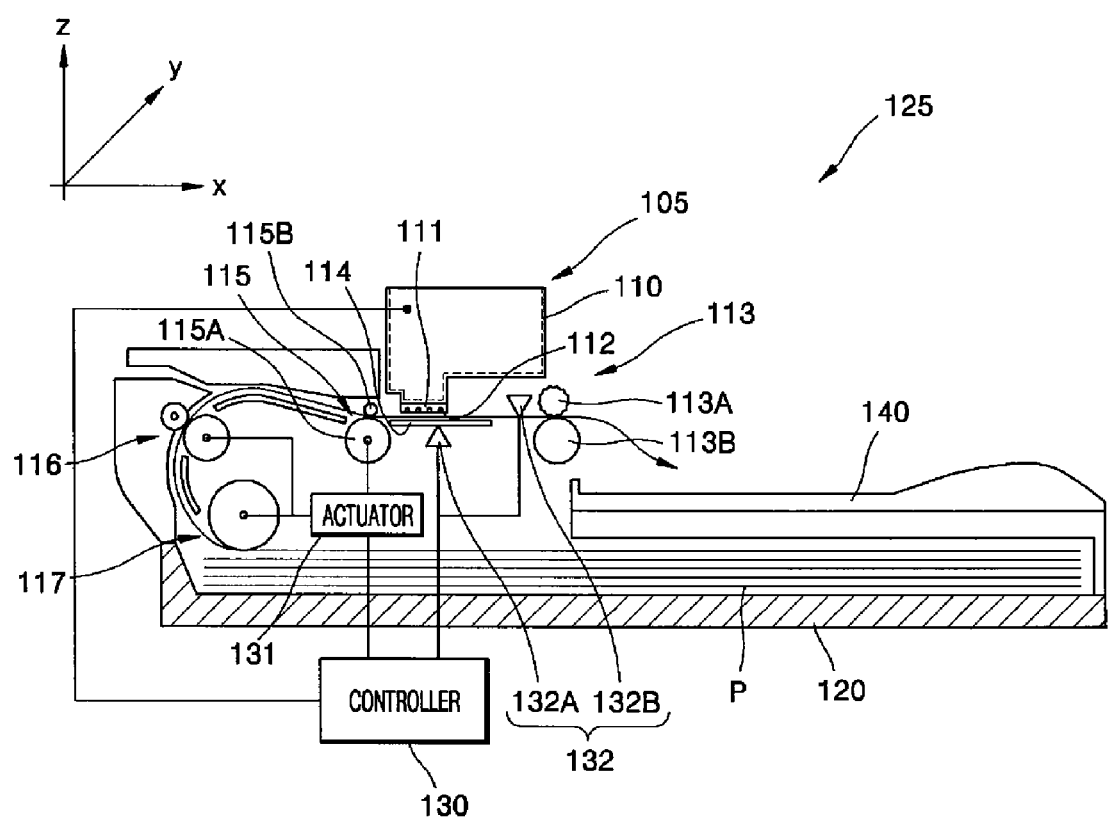
FIG. 2 is a schematic sectional view illustrating an image forming apparatus of the inkjet image forming system of FIG. 1.

FIG. 1 is a block diagram illustrating an image forming system according to an embodiment of the present general inventive concept, and FIG. 2 is a schematic sectional view illustrating an image forming apparatus 125 of the image forming system of FIG. 1.

Referring to FIG. 1, the image forming system includes a host device 200 (hereinafter host 200) and the inkjet image forming apparatus 125.

The host 200 may be a host system such as a personal computer, a digital camera, a PDA, or a multi function peripheral (MFP). The host 200 determines data to be printed by the inkjet image forming apparatus 125.

The host 200 includes a printing data generator 210 to generate printing data, a printing data calculator 220 to calculate an amount of printing data and to determine an amount of time to process the printing data (i.e., processing time), a printing data converter 230 to convert the printing data, and a printing data transmitter 240 to transmit the converted printing data.

The printing data generator 210 generates the printing data to be printed. The printing data is generated when a user runs an application program on the host 200, such as MICROSOFT WORD, EXCEL (spread sheet program), POWER POINT (presentation program), or ADOBE PHOTOSHOP (graphics program). The application program creates and edits an object that can be printed using the inkjet image forming apparatus 125. If the application program is a word processor, the printing data may be text data. If the application program is a graphics program, the printing data may be image data. For example, if the host 200 uses MICROSOFT WINDOWS operating system, the printing data may be contained in an enhanced meta file having a filename extension of *.emf. Generally, the printing data generated by the application program is sent to the inkjet image forming apparatus 125 after the printing data is converted by the printing data converter 230 to a printing language.

When the printing data is generated by the printing data generator 210, the printing data calculator 220 calculates the amount of printing data and the amount of time to process the printing data, and transmits the resulting information to a controller 130 (described below) of the image forming apparatus 125.

The printing data processing time includes time to convert the printing data with the printing data converter 230, and time to transmit the printing data from the printing data transmitter 240 to the inkjet image forming apparatus 125. The printing data converter 230 converts the printing data generated by the application program into instructions that can be interpreted by the inkjet image forming apparatus 125. That is, the printing data converter 230 interprets, parses, and renders the printing data generated by the printing data generator 210 to create printing data for each color such as cyan, magenta, yellow, and black. After the rendering operation, the printing data can be interpreted by the inkjet image forming apparatus 125.

For example, although not shown, the printing data converter 230 may include a graphics device interface (GDI) and an image forming apparatus driver. The object (i.e., the printing data) generated by the application program is transmitted to the image forming apparatus driver through the GDI that is included in the operating system of the host 200. In other words, the application program utilizes the image forming apparatus driver to generate and edit the printing data that can be printed by the inkjet image forming apparatus 125. The GDI of the host 200 receives the printing data from the application program, provides the printing data to the image forming apparatus driver, and generates instructions related to the printing data in response to a request from the image forming apparatus driver. The image forming apparatus driver may be a program installed in the host 200 to generate the instructions that can be interpreted by the inkjet image forming apparatus 125. The printing data transmitter 240 transmits the instructions generated by the image forming apparatus driver to an input/output device connected to the inkjet image forming apparatus 125. As described above, the printing data converter 230 converts the printing data generated by the printing data generator 210 so that firmware of the inkjet image forming apparatus 125 can interpret the printing data.

The printing data transmitter 240 transmits the printing data converted by the printing data converter 230 to the inkjet image forming apparatus 125. The printing data transmitter 240 may include a spooler (not shown). The spooler is a program included in the operating system of the host 200. The spooler transmits the instructions generated by the image forming apparatus driver to the input/output device that is connected to the inkjet image forming apparatus 125. The printing data transmitter 240 may be included in a driver (not shown) installed in the host 200.

A structure of the inkjet image forming apparatus 125 of the image forming system will now be described.

Referring to FIG. 2, the inkjet image forming apparatus 125 includes a cassette 120, a printhead unit 105, a support 114 facing the printhead unit 105, a detector 132 to detect malfunctioning nozzles, a printing medium conveying unit 117, 116, 115, and 113 to convey printing media (P) in a first direction, an output tray 140 to receive output printing media (P) after printing, and the controller 130 to control an overall operation of the inkjet image forming apparatus 125.

The cassette 120 stores printing media (P), and the printing medium conveying unit 117, 116, 115, and 113 conveys the printing media (P) to a printhead 111.

The printing medium conveying unit 117, 116, 115, and 113 conveys the printing media (P) stored in the cassette 120 along a predetermined path. In the present embodiment, the printing medium conveying unit 117, 116, 115, and 113 includes a pick-up roller 117, an auxiliary roller 116, a feed roller 115, and an eject roller 113. The printing medium conveying unit 117, 116, 115, and 113 is operated by an actuator 131, such as a motor to convey the printing media (P). The actuator 131 is controlled by the controller 130. The pick-up roller 117 is installed on one side of the cassette 120 to pick up the printing media (P) one by one from the cassette 120. The feed roller 115 is installed at a front side of the printhead 111 to feed the printing media (P) to the printhead 111. The feed roller 115 includes a driving roller 115A connected to the actuator 131 and an idle roller 115B that elastically engages with the driving roller 115A. The auxiliary roller 116 may be installed between the pick-up roller 117 and the feed rollers 115. The eject roller 113 is installed at a rear side of the printhead 111 (i.e., opposite the feed roller 115) to discharge the printing media (P) to the output tray 140 after printing. The eject roller 113 includes a star wheel 113A installed along a widthwise direction of the printing medium (P) and a support roller 113B facing the star wheel 113A to support the printing medium (P) from below. When the printing media (P) passes between the printhead 111 and the support 114, ink is ejected from a nozzle unit 112 of the printhead 111 onto the printing media (P). The printing medium (P) may be deformed by the ejection of the ink, which makes it difficult to maintain a proper gap distance between the printhead 111 and the printing medium (P). In order to prevent this deformation and problems associated therewith, a portion of the star wheel 113A protrudes further down than the nozzle unit 112 of the printhead 111. In this position, the star wheel 113A pulls the printing medium (P) out while coming in contact with the printing medium (P) such that the gap distance between the printing medium (P) and the printhead 111 can be kept constant without contact therebetween.

Referring to FIGS. 1 and 2, the inkjet image forming apparatus 125 includes a maintenance unit 172 to return the printhead 111 to a ready state by preparing the printhead 111 for printing. The maintenance unit 172 may include a cap to cap the nozzle unit 112 of the printhead 111, a wiper to wipe the nozzle unit 112, and a waste ink collector to collect ink spat from the nozzle unit 112 during a spitting operation. Since a structure and operation of the maintenance unit 172 should be known to those of ordinary skill in the art, a detailed description thereof will not be provided. Other maintenance or preparation operations may also be performed by the maintenance unit 172.

The support 114 is located under the printhead 111 to support the printing medium (P) from below. The support 114 keeps the printing medium (P) spaced apart from the nozzle unit 112 by a predetermined distance, which corresponds to the proper gap distance, ranging from about 0.5 mm to about 2.5 mm.

The detector 132 detects any nozzles in the nozzle unit 112 which malfunction. The detector 132 includes a first detector 132A to detect malfunctioning nozzles before printing and a second detector 132B to detect malfunctioning nozzles during printing. The detector 132 sends the detection information to the controller 130.

The printhead unit 105 ejects ink onto the printing media (P). The printhead unit 105 includes a body 110, the printhead 111 on one side of the body 110, and the nozzle unit 112 formed in the printhead 111. The feed roller 115 and eject roller 113 are respectively installed before and after the nozzle unit 112. The nozzle unit 112 includes a driving circuit (not shown) and a cable (not shown) to receive printing data, power, control signals, etc. The nozzle unit 112 may include a plurality of nozzle units and/or head chips. The cable may be a flexible printed circuit (FPC) or a flexible flat cable (FFC).

Although not illustrated, an ink cartridge may be detachably installed in the body 110. Also, the body 110 may include chambers in communication with the nozzle unit 112, a passage such as an orifice to supply ink from the ink cartridge to the chambers, a manifold (common flow passage) to supply the ink from the passage to the chambers, and restrictors branching off from the manifold to the chambers to supply ink from the manifold to each chamber. An actuator such as a piezoelectric actuator or a heater is provided in each chamber. Since the actuators, chambers, passage, manifold, and restrictors should be known to those of ordinary skill in the art, detail descriptions thereof will not be provided.

Referring again to FIGS. 1 and 2, the inkjet image forming apparatus 125 includes a video controller 180, the controller 130, a memory 175, the maintenance unit 172, a maintenance calculator 170, and an image forming unit 165. The video controller 180 may include a non-volatile random access memory (NVRAM) 185, a static random access memory (SRAM, not shown), a synchronous dynamic random access memory (SDRAM), a NOR Flash (not shown), and a real time clock (RTC) 190.

The video controller 180 interprets the instructions received from the printing data transmitter 240 to convert the received instructions into a corresponding bitmap. The bitmap is provided to the controller 130. The controller 130 provides the bitmap to each component of the inkjet image forming apparatus 125 to print the bitmap on the printing media (P).

A maintenance driving unit (not illustrated) of the inkjet image forming apparatus 125 drives the maintenance unit 172 to prepare (i.e., return) the printhead 111 to a ready state. The ready state is a state in which the printhead 111 has been maintained and is ready for printing. The maintenance unit 172 performs suction, capping, wiping, spitting, and/or other operations. In cold conditions (e.g., when the inkjet image forming apparatus 125 is initially turned on), a viscosity of the ink in the printhead 111 is initially high, which decreases printed image quality. In order to prevent this problem, the maintenance unit 172 may perform a temperature controlling operation. For example, the maintenance unit 172 may preheat the printhead 111 before printing, or cool the printhead 111 by temporarily stopping or suspending printing when overheated.

In the suction operation, ink remaining in the nozzle unit 112 is sucked out in order to clean the nozzle unit 112.

In the capping operation, the nozzle unit 112 is covered or uncovered with a cap to prevent caking of the ink in the nozzle unit 112 and to prevent contamination of the nozzle unit 112. In the wiping operation, ink remaining on a surface of the nozzle unit 112 is wiped off. Since ink remaining on the nozzle unit 112 can cause inaccurate droplet ejection, the wiping operation is performed to maintain printing quality.

In the spitting operation, a small amount of ink is ejected from the nozzle unit 112 to prevent dryness of the nozzle unit 112. The spitting operation may be performed before or during printing.

The maintenance calculator 170 calculates an operating time of the maintenance unit (i.e., a maintenance time) and provides the calculated operating time of the maintenance unit 172 to the controller 130.

The controller 130 may be provided on a mother board of the inkjet image forming apparatus 125. The controller 130 receives signals from the printing data calculator 220 (i.e., the processing time of the printing data) and the maintenance calculator 170 (i.e., the maintenance time) to generate control signals for the maintenance unit 172 while the host 200 performs the printing data processing. For example, the controller 130 operates the maintenance unit 172 during the printing data processing in the host 200 (i.e. during the printing data conversion in the printing data converter 230 and the printing data transmission by the printing data transmitter 240). That is, the controller 130 controls the printing data processing and the operation of the maintenance unit 172 to overlap with respect to each other.

Figure 3:
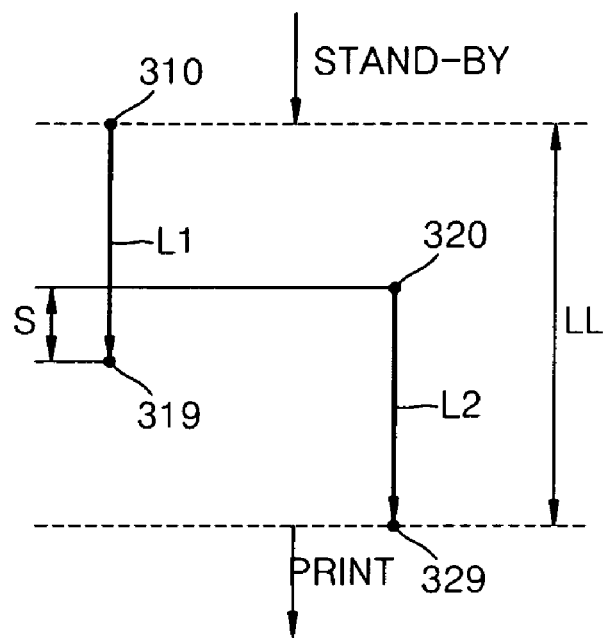
FIG. 3 is a chart illustrating a method of increasing a printing speed of an inkjet image forming system according an embodiment of the present general inventive concept.

FIG. 3 is a chart illustrating a method of increasing the printing speed of an inkjet image forming system according an embodiment of the present general inventive concept. The method of FIG. 3 may be used in the inkjet image forming system of FIG. 1 and/or the inkjet image forming apparatus 125 of FIG. 2. Accordingly, for illustration purposes, the method of FIG. 3 is described below with reference to FIGS. 1 through 3.

Since the inkjet image forming apparatus 125 is capable of printing images having a higher quality at a higher speed due to advances in related technologies, an amount of printing data has also increased. Accordingly, even though developments of various data compression technologies and data transfer protocols have been made, more time is required to transmit printing data from the host 200 to the inkjet image forming apparatus 125, thereby making it difficult to attain a high-speed inkjet image forming system. The printing speed of an inkjet image forming system is generally determined by a printing time of a printhead, paper feeding and discharging times, and a maintenance time. Because printing is not actually being performed during the maintenance time, the maintenance time is considerably long, thereby decreasing the printing speed of the inkjet image forming system. However, according to embodiments of the present general inventive concept, the maintenance operation(s) and the printing data processing are controlled to overlap with each other to increase the printing speed.

Text or an image can be created and/or edited using an application program running in the host 200. This editing operation can be performed in a stand-by mode of the inkjet image forming system.

When the editing operation is completed in the stand-by mode, a user may select a print menu of the application program to print the edited text or image. When the print menu is selected, the printing data generator 210 generates printing data corresponding to the edited text or image. The printing data is transmitted to the inkjet image forming apparatus 125 through the printing data converter 230 and the printing data transmitter 240. These operations will be referred to as a first process (or operation) of the inkjet image forming system.

That is, the first process includes generating the printing data using the application program of the host 200, converting the printing data into instructions that can be interpreted by the inkjet image forming apparatus 125, and transmitting the instructions to the inkjet image forming apparatus 125.

When the inkjet image forming apparatus 125 receives the printing data from the host 200, ink is ejected from the nozzle unit 112 of the printhead 111 to print the printing data on the printing medium P. This will be referred to as a print mode of the inkjet image forming system.

Before ink is ejected from the printhead 111, a maintenance operation is performed to prepare the printhead 111 to a print-ready state. This will be referred to as a second process (or operation) of the inkjet image forming system.

That is, the second process may include wiping the printhead 111 to remove remaining ink and spitting a small amount of ink from the printhead 111. The second process may further include preheating the printhead 111.

In order to print an image, the inkjet image forming system operates in the stand-by mode, then performs the first and second processes, and operates in the print mode sequentially. Here, a first lead time L1 of the first process represents a time required to process the printing data in the host 200 and transmit the printing data from the host 200 to the inkjet image forming apparatus 125, and a second lead time L2 of the second process represents a time required to perform the maintenance operation(s) on the printhead 111 using the maintenance unit 172. The first lead time L1 is overlapped with at least a portion of the second lead time L2 to increase the printing speed of the inkjet image forming system. The controller 130 generates a control signal to control the overlap operation of the inkjet image forming system. Referring to FIG. 3, the first lead time L1 and the second lead time L2 overlap with each other by an overlap time S to increase the printing speed of the inkjet image forming system. After the stand-by mode, a total process lead time LL is required to complete both the first and second processes. Then, the print mode starts. The printing speed of the inkjet image forming system may be maximized when the total process lead time LL is minimized by maximizing the overlap time S. In other words, the controller 130 controls the maintenance unit 172 to begin the maintenance operation(s) while the host 200 is processing the printing data according to a comparison of the processing time received from the printing data calculator 220 and the maintenance time received from the maintenance calculator 170.

In other words, the first lead time L1 of the first process may be mostly overlapped with the second lead time L2 of the second process when start points 310 and 320 of the first and second processes, respectively, are synchronized and end points 319 and 329 of the first and second processes, respectively, are synchronized. This synchronization will now be described with reference to FIGS. 4 and 5, in which exemplary embodiments of the present general inventive concept are illustrated.

Figure 4:
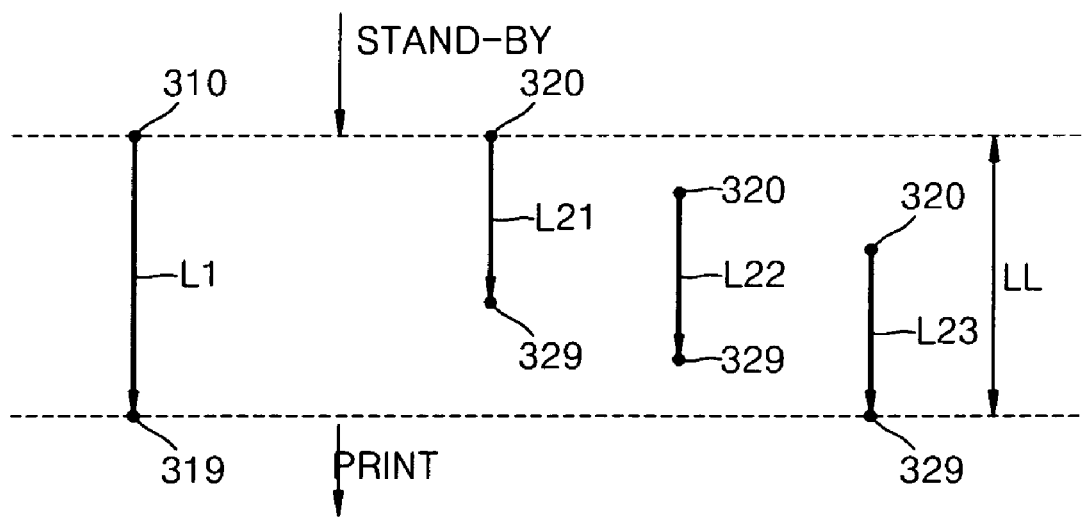
FIG. 4 is a chart illustrating a method of increasing a printing speed of an inkjet image forming system according another embodiment of the present general inventive concept.

FIG. 4 is a chart illustrating a method of increasing the printing speed of an inkjet image forming system according another embodiment of the present general inventive concept, in which a second lead time of a second process is shorter than a first lead time of a first process when compared with the previous embodiment of FIG. 3. It should be noted that some of the reference numbers used in FIG. 3 are also used to refer to similar components in FIG. 4. In FIG. 4, a second lead time of the second process is represented by L21, L22, or L23 according to a location of the start point 320 of the second process. Referring to FIG. 4, both start and end points 320 and 329 of the second process occur within a first lead time L1 of a first process. Here, a method of synchronizing the start and end points 320 and 329 of the second process with start and end points 310 and 319 of the first process can be explained using the following three exemplary cases. The controller 130 controls the operation of the inkjet image forming system based on the synchronization method.

In a first case of the synchronization method, the start point 320 of the second lead time L21 is synchronized with the start point 310 of the first lead time L1. In this first case, a total process lead time LL required to complete both the first and second processes can be minimized without comparing a length of the first lead time L1 with a length of the second lead time L21 using the controller 130. In a second case of the synchronization method, the end point 329 of the second lead time L23 is synchronized with the end point 319 of the first lead time L1. In this second case, ink can be ejected immediately after maintenance of the printhead 111 such that the printing speed of the inkjet image forming system can be improved and further the effect of the maintenance of the printhead 111 can be maximized. In a third case of the synchronization method, the start and end points 320 and 329 of the second lead time L22 are located between the start and end points 310 and 319 of the first lead time L1, respectively. This third case may be useful when it is difficult to exactly synchronize the start points 310 and 320 of the first and second processes or the end points 319 and 329 of the first and second processes.

Figure 5:
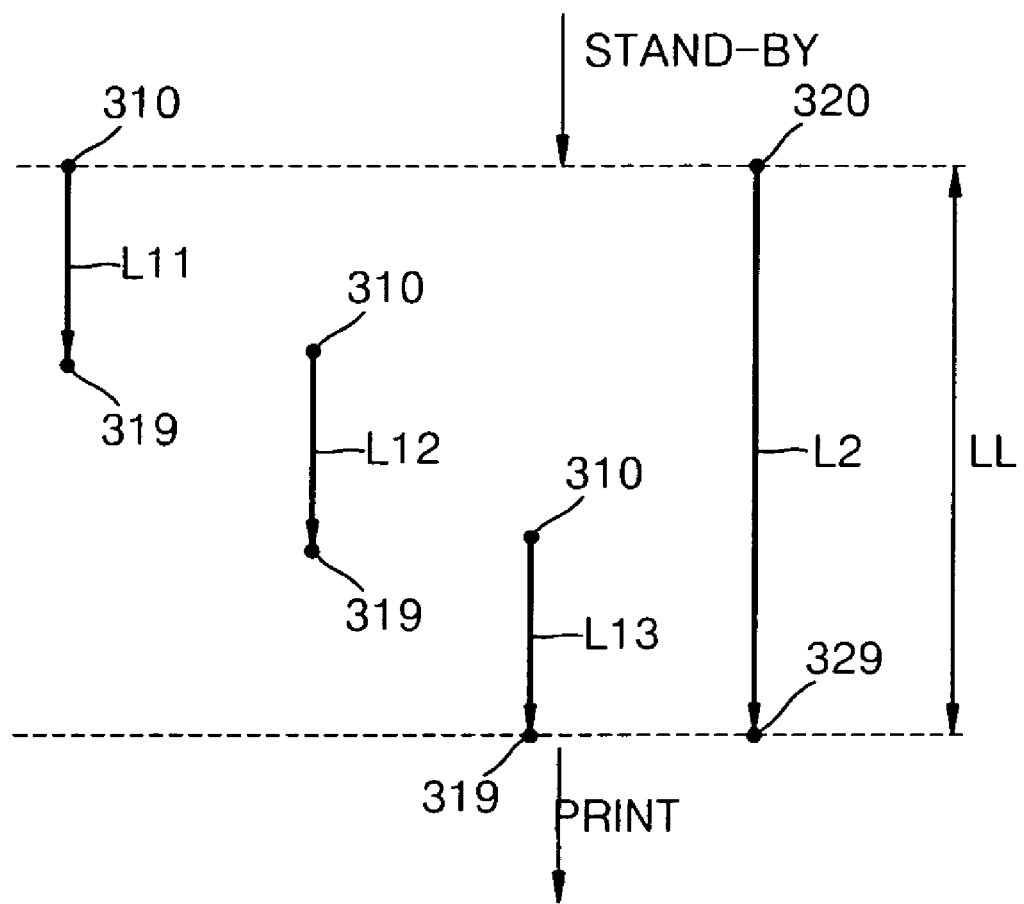
FIG. 5 is a chart illustrating a method of increasing a printing speed of an inkjet image forming system according another embodiment of the present general inventive concept.

FIG. 5 is a chart illustrating a method of increasing the printing speed of an inkjet image forming system according another embodiment of the present general inventive concept, in which a lead time of a first process is shorter than a lead time of a second process when compared with the previous embodiment of FIG. 3. It should be noted that some of the reference numbers used in FIG. 3 are also used to refer to similar components in FIG. 5. Referring to FIG. 5, both start and end points 310 and 319 of a first process occur within a second lead time L2 of a second process. Here, a method of synchronizing the start and end points 310 and 319 of the first process with start and end points 320 and 329 of the second process, respectively, can be explained using the following three exemplary cases. In FIG. 5, a first lead time of the first process is represented by L11, L12, or L13 according to a location of the start point 310 of the first process. The synchronization method of the present embodiment may be substantially similar to the embodiment of FIG. 4 except that the first lead time L1 of the first process is shorter than the second lead time L2 of the second process.

The embodiments of the present general inventive concept can be embodied as computer readable codes on a computer readable recording medium. The computer readable recording medium may include any data storage device that can store data which can be thereafter read by a computer system. Examples of the computer readable recording medium include a read-only memory (ROM), a random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. The embodiments of the present general inventive concept may also be embodied in hardware or a combination of hardware and software. For example, the controller 130 of the inkjet image forming apparatus 125 may be embodied in software, hardware, or a combination thereof.

As described above, according to various embodiments of the present general inventive concept, in an inkjet image forming system and a method of increasing a printing speed of the inkjet image forming system, printing data processing and a maintenance operation are controlled to overlap with each other to increase the printing speed of the inkjet image forming system. Therefore, according to the embodiments of the present general inventive concept, images can be printed at a higher speed than in conventional methods and printers.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of increasing a printing speed of an inkjet image forming system having an inkjet image forming apparatus with a printhead and a maintenance unit, and a host in communication with the inkjet image forming apparatus, the method comprising:

overlapping at least a portion of a first lead time of a first process that includes processing printing data in the host and transmitting the printing data to the inkjet image forming apparatus with at least a portion of a second lead time of a second process that includes performing a maintenance operation on the printhead with the maintenance unit.

2. The method of claim 1, wherein a start point and an end point of the first process are synchronized with a start point and an end point of the second process, respectively, to maximize the overlap between the first lead time of the first process and the second lead time of the second process.

3. The method of claim 2, wherein if the first lead time of the first process is longer than the second lead time of the second process, the start point and the end point of the second process occur within the first lead time of the first process.

4. The method of claim 3, wherein the start point of the first process is coincident with the start point of the second process or the end point of the first process is coincident with the end point of the second process 5. The method of claim 2, wherein if the second lead time of the second process is longer than the first lead time of the first process, the start point and the end point of the first process occur within the second lead time of the second process 6. The method of claim 5, wherein the start point of the first process is coincident with the start point of the second process or the end point of the first process is coincident with the end point of the second process.

7. The method of claim 1, wherein the first process comprises:

generating printing data using an application program running in the host;

converting the printing data into instructions that are interpretable by the inkjet image forming apparatus; and transmitting the instructions to the inkjet image forming apparatus.

8. The method of claim 7, wherein the second process comprises:

wiping the printhead to remove ink stuck to the printhead; and spitting a small amount of ink from the printhead.

9. The method of claim 8, wherein the second process further comprises:

preheating the printhead according to printing circumstances.

10. A method of forming an image in an image forming apparatus having a printhead, the method comprising:

performing one or more preparation operations on the printhead while print data is being processed in a host device in communication with the image forming apparatus.

11. The method of claim 10, wherein the performing of the one or more preparation operations comprises:

estimating an amount of print data and a corresponding amount of time to process the print data; and beginning the one or more preparation operations before the host device completes processing of the print data.

12. The method of claim 10, wherein the one or more preparation operations comprise maintenance operations including one or more of temperature controlling operation, returning the printhead to a ready state, a suction operation to suck out ink remaining in the printhead, a capping operation to prevent caking of ink on the printhead, a wiping operation to wipe ink remaining on a surface of the printhead, and a spitting operation to spit ink from the printhead.

13. A method of forming an image, the method comprising:

generating print data;

estimating a processing time to process the generated print data; and outputting the processing time to process the generated print data to an image forming apparatus such that the image forming apparatus performs any preparation operations on a printhead according to the output processing time.

14. A method of forming an image in an image forming apparatus, the method comprising:

receiving a processing time to process print data from a host device;

estimating a maintenance time to prepare the image forming apparatus for printing; and comparing the maintenance time with the processing time and beginning maintenance on the image forming apparatus before the processing time has expired.

15. The method of claim 14, wherein the beginning of the maintenance comprises:

synchronizing an expiration of the maintenance time with an expiration of the processing time.

16. An inkjet image forming system, comprising:

an inkjet image forming apparatus including a printhead to eject ink to print printing data and a maintenance unit to perform a maintenance operation on the printhead;

a host in communication with the inkjet image forming apparatus; and a controller to generate a control signal to overlap at least a portion of a first process that includes processing printing data in the host and transmitting the printing data to the inkjet image forming apparatus with at least a portion of a second process that includes performing a maintenance operation on the printhead with the maintenance unit.

17. The inkjet image forming system of claim 16, wherein the controller generates a control signal synchronizing a start point and an end point of the first process with a start point and an end point of the second process, respectively, to maximize an overlapping time between the first process and the second process.

18. The inkjet image forming system of claim 17, wherein if a first lead time of the first process is longer than a second lead time of the second process, the controller generates a control signal to control the start point and the end point of the second process to occur within the first lead time of the first process.

19. The inkjet image forming system of claim 18, wherein the controller generates a control signal that makes the start point of the first process coincident with the start point of the second process or the end point of the first process coincident with the end point of the second process.

20. The inkjet image forming system of claim 17, wherein if a second lead time of the second process is longer than a first lead time of the first process, the controller generates a control signal making the start point and the end point of the first process occur within the second lead time of the second process.

21. The inkjet image forming system of claim 20, wherein the controller generates a control signal that makes the start point of the fir t process coincident with the start point of the second process or the end point of the first process coincident with the end point of the second process.

22. The inkjet image forming system of claim 16, wherein the host comprises:
   a printing data generator to generate printing data using an application program running in the host;
   a printing data converter to convert the printing data into instructions that are interpretable by the inkjet image forming apparatus; and
   a printing data transmitter to transmit the instructions to the inkjet image forming apparatus.

23. An image forming system, comprising:
   an image forming apparatus, including:
      a printhead;
      a maintenance unit; and
      a controller to control the maintenance unit to perform one or more preparation operations on the printhead of the image forming apparatus while print data is being processed in a host device in communication with the image forming apparatus.

24. The system of claim 23, further comprising:
   the host device, including:
      a printing data calculator to estimate an amount of print data and a corresponding amount of time to process the print data and to provide the amount of time to the controller such that the controller controls the maintenance unit to begin the one or more preparation operations before the host device completes processing of the print data.

25. The system of claim 23, wherein the host device processes the print data by converting print data from an application to one or more printer commands that are recognizable by the image forming apparatus and transmitting the one or more printer commands to the image forming apparatus.

26. The system of claim 23, wherein the one or more preparation operations comprise maintenance operations including one or more of a temperature controlling operation, returning the printhead to a ready state, a suction operation to suck out ink remaining in the printhead, a capping operation to prevent caking of ink on the printhead, a wiping operation to wipe ink remaining on a surface of the printhead, and a spitting operation to spit ink from the printhead.

27. An image forming system, comprising:
   a host device, including:
      a printing data generator to generate print data; and
      a printing data calculator to estimate a processing time to process the generated print data and to output the processing time to process the generated print data to an image forming apparatus such that the image forming apparatus performs any preparation operations on the printhead according to the output processing time.

28. An image forming system, comprising:
   an image forming apparatus, including:
      a maintenance unit;
      a maintenance calculator to estimate a maintenance time to prepare the image forming apparatus for printing; and
      a controller to receive a processing time to process print data from a host device, to compare the maintenance time with the processing time, and to control the maintenance unit to begin maintenance on the image forming apparatus before the processing time has expired.

29. The system of claim 28, wherein the controller synchronizes an expiration of the maintenance time with an expiration of the processing time and controls the maintenance unit accordingly.

30. A computer readable medium containing executable code to control an image forming apparatus having a maintenance unit, the medium comprising:
   a first executable code to estimate a maintenance time to prepare the image forming apparatus for printing; and
   a second executable code to receive a processing time to process print data from a host device, to compare the maintenance time with the processing time, and to control the maintenance unit to begin maintenance on the image forming apparatus before the processing time has expired.

31. An image forming system, comprising:
   a host device;
   an image forming device having a printhead; and a
   controller to control one or more preparation operations on the printhead of the image forming device while print data is processed in the host device in communication with the image forming device.

* * * * *

UNITED STATES PATENT AND TRADEMARK OFFICE
CERTIFICATE OF CORRECTION

PATENT NO. : 7,588,310 B2  Page 1 of 1
APPLICATION NO. : 11/427966
DATED : September 15, 2009
INVENTOR(S) : Baek et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 578 days.

Signed and Sealed this

Twenty-first Day of September, 2010

David J. Kappos
*Director of the United States Patent and Trademark Office*